United States Patent [19]
Lewis et al.

[11] Patent Number: 5,644,316
[45] Date of Patent: Jul. 1, 1997

[54] ACTIVE PHASED ARRAY ADJUSTMENT USING TRANSMIT AMPLITUDE ADJUSTMENT RANGE MEASUREMENTS

[75] Inventors: Gib F. Lewis, Manhattan Beach; Eric N. Boe, Long Beach, both of Calif.

[73] Assignee: Hughes Electronics, Los Angeles, Calif.

[21] Appl. No.: 642,093

[22] Filed: May 2, 1996

[51] Int. Cl.$^6$ ................................................ G01S 7/40
[52] U.S. Cl. ................................................ 342/174
[58] Field of Search ........................ 342/372, 173, 342/174

[56] References Cited

U.S. PATENT DOCUMENTS

| 5,093,667 | 3/1992 | Andricos | 342/372 |
| 5,412,414 | 5/1995 | Ast et al. | 342/174 |
| 5,530,449 | 6/1996 | Wachs et al. | 342/174 |

*Primary Examiner*—Theodore M. Blum
*Attorney, Agent, or Firm*—Leonard A. Alkov; Wanda K. Denson-Low

[57] ABSTRACT

An RF drive leveling adjustment method using transmit amplitude adjustment range for use with active phased array antenna systems. Relative RF measurements of transmit amplitude adjustment range of an active array antenna or selected elements or sets of elements of the antenna are used to determine correction factors for RF drive levels of RF drive amplifier(s) used by transmit modules of the active array antenna. The method comprises the following steps. The first step comprises calibrating the transmit RF drive amplifiers of an active array antenna for a predetermined transmit duty factor and pulse repetition frequency. The second step comprises measuring relative RF measurements of transmit amplitude adjustment range of the transmit module. The third step comprises determining correction factors for RF drive levels of the transmit RF drive amplifiers. The fourth step comprises adjusting the RF drive level of the transmit RF drive amplifiers using the correction factors. by using the correction factors, phase and gain command linearization table performance of the transmit modules is preserved.

4 Claims, 2 Drawing Sheets

ACTIVE PHASED ARRAY ADJUSTMENT USING TRANSMIT AMPLITUDE ADJUSTMENT RANGE MEASUREMENTS

BACKGROUND

The present invention relates generally to active phased array radars, and more particularly, to an RF transmit drive leveling adjustment method using transmit amplitude adjustment range measurements for use with active phased array antennas.

Maintaining RF drive levels of active phased array radars identical to those used during calibration measurements is necessary to minimize residual errors of active array element phase and amplitude control. This correct RF drive level corresponds to a transmit gain compression point at which transmit calibration measurements were initially made. Conventional array transmit RF drive level control considerations are based on maintaining absolute power levels. These absolute power measurements have typically been required for all array transmit calibration measurements, and during array transmit operation. This technique allows for the use of a relative, versus an absolute, measure of transmit RF drive.

Extending the useful range of command linearization tables by adjusting transmit RF drive levels can save considerable calibration resources associated with adjustment over a variety of radar waveforms. The amount of memory savings depends on the antenna sidelobe requirements, the range of required radar mode waveforms and the number of command linearization tables for a given array antenna. The savings will occur due to a reduction in the cost of the electronic hardware, and also in terms of array test time, associated data processing and subsequent verification.

Accordingly, it is an objective of the present invention to provide for an RF transmit drive leveling adjustment method using transmit amplitude adjustment range measurements for use with active phased array antennas. It is a further objective of the present invention to provide for an RF transmit drive leveling adjustment method that extends the useful range of command linearization tables used in active phased array radars.

SUMMARY OF THE INVENTION

To meet the above and other objectives, the present invention is an RF transmit drive leveling adjustment method for use with active phased array radars operating in transmit mode that provide for RF transmit drive leveling adjustment. The present method also provides for correction of phase and gain command linearization tables by maintaining consistency in transmit amplitude adjustment range. Relative RF measurements of the transmit amplitude adjustment range of the phased array or selected elements or sets of elements thereof are used to determine correction factors for RF drive level(s) of RF drive amplifier(s) of active array transmit modules. The method of the present invention may also use relative RF measurements of the transmit amplitude adjustment range to correct phase and gain command linearization tables employed in transmit/receive modules of the radar.

The present method comprises the following four steps. (1) Calibrating a transmit module of an active array antenna for predetermined sets of transmit duty factors and pulse repetition frequencies. (2) Measuring transmit gain compression using relative RF measurement techniques and amplitude adjustment features in the transmit modules. (3) Determining correction factors for RF drive levels of the transmit module determined to maintain constant transmit gain compression. (4) Adjusting the RF drive level of the transmit module using the correction factors.

The present invention uses measurements of the transmit gain compression of the active array to solve two calibration issues key to transmit operation of active array antennas. These calibration issues involve setting of operational RF drive level(s) of the RF amplifier(s) that drive the transmit module of the active array, and correcting phase and gain command linearization tables of the transmit module for variations induced by changes in RF transmit waveform, temperature, and other conditions.

The present method resolves these calibration issues by determining correction factors for active array RF drive levels based on preservation of gain compression. Gain compression is accurately measured using relative techniques. This may be accomplished for a single array driven by one RF drive amplifier or for an array driven by separate RF drive amplifiers. The method resolves the second calibration issue relating to correction of transmit module phase and gain command linearization tables caused by the effects of changing transmit duty factor, temperature, pulse repetition frequencies, and other conditions by using amplitude adjustment range values obtained through relative RF measurements.

RF drive leveling using relative measurements alleviates a more difficult absolute power determination problem. In conventional exciter designs, RF drive power is typically measured at the output of the exciter and RF drive amplifier(s) internal to the exciter are leveled to preserve a given RF drive level. The present method measures the effects of drive variation indicated by the array during actual operation. Array performance variability is best controlled by end-to-end measurements rather than by measurements made at some intermediate level, and therefore, better error control tolerances are achieved. The present invention thus uses readily-made relative RF measurements to set the transmit RF drive level.

The present invention may be used in any active array radar that transmits and is operated in a nonlinear saturated region. The present invention also requires that transmit modules contain transmit amplitude controls. The present invention may be used to reduce active array sidelobes and to improve the interface between an active array antenna and its transmit RF drive amplifier(s).

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
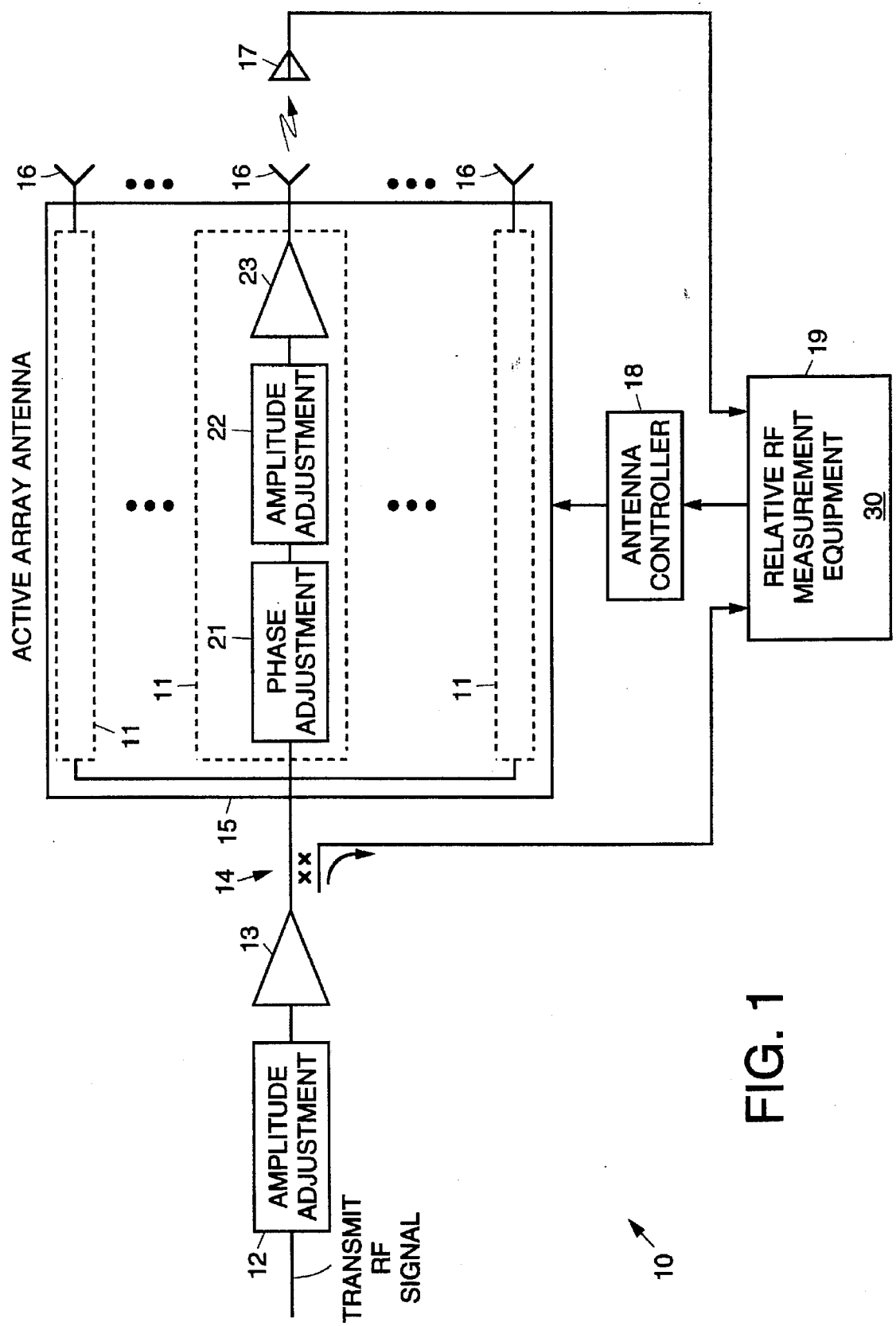
FIG. 1 shows a block diagram of a portion of an active array antenna system in which the present invention is employed.

Referring to the drawing figures, FIG. 1 shows a portion of an active array antenna system 10 in which a method 30 in accordance with the present invention is employed. The antenna system 10 comprises a transmit drive amplifier 13 that includes an amplitude adjustment circuit 12 that is used to adjust the amplitude of transmit RF drive signals applied to one or more transmit modules 11. Each transmit module 11 comprises a phase adjustment circuit 21, an amplitude adjustment circuit 22 and an amplifier 23. The amplitude adjustment circuit 12 may comprise a digitally controlled attenuator, for example, that controls the gain of the transmit RF drive signal.

Amplified transmit RF drive signals derived from the RF amplifiers 13 are applied to an active array antenna 15 comprising a plurality of antenna elements 16. A portion of the amplified transmit RF drive signal is coupled off by means of a coupler 14 or power splitter 14 and applied to relative RF measurement apparatus 19 that implements the present method 30. A receive antenna 17 is used to sample the output of the active array antenna 15, which output is fed to the relative RF measurement apparatus 19 for processing. An output of the relative RF measurement apparatus 19 is applied to the amplitude adjustment module 12 to control the gain of the transmit RF drive signals coupled to each of the antenna elements 16 of the active array antenna 15.

Active array transmit RF drive level determination in accordance with the present invention will first be discussed for the case where an attenuator is used as the amplitude adjustment circuit 12 to control the transmit RF drive amplifier(s) 13 during transmission. Measurement of array gain compression begins with an initial calibration measurement that must be known for given defining sets of transmit duty factors and pulse repetition frequencies. Typically, a selected transmit RF drive level for the amplifiers 13 is set and measurements are begun. A range of amplitude control adjustments is derived for the transmit modules 11 by making measurements with different transmit module attenuation levels. This range is fixed for each transmit module 11 provided that step sizes of its internal attenuator, transmit compression characteristics, and performance characteristics of an associated cooling system (not shown) do not drift over time. The following equation is used in this situation:

$$G_{max,T}/G_{min,T}=A_T=\text{a constant for fixed operating conditions,}$$

where: $G_{max,T}$ is the maximum elemental gain when transmitting, $G_{min,T}$ is the minimum elemental gain when transmitting, $A_T$ is the transmit amplitude adjustment range, and the magnitude is related to gain compression.

During subsequent operation of the antenna 15, the transmit RF drive level is adjusted so that the transmit module 11 adjustment ranges match the original set determined during initial calibration. That is, the RF drive level of the amplifiers 13 is adjusted until the least deviation from all recorded elemental amplitude adjustment ranges is achieved. This adjusted level is optimum and is found through relative RF measurements (maximum to minimum gain ratios), or a best fit process if the measured values do not come out exactly as expected based upon previous measurements.

RF drive levels for transmit/receive modules 11 that share an attenuator for both transmission and reception are determined using the present method 30 as follows. The nonsaturated receive adjustment range is used along with the saturated transmit amplitude adjustment range to directly yield gain compression values. This has the advantage of providing compression information that is independent of drift in the amplitude adjustment range. The following equations are used in this situation.

$$G_{max,R}/G_{min,R}=A_R, \text{ and } G_{max,T}/G_{min,T}=A_T=A_R/A_{comp}, (G_{max,R}/G_{min,R})/(G_{max,T}/G_{min,T})=A_R/A_R/A_{comp}=A_{comp}=\text{transmit gain compression, } A_{comp}= \text{a constant for fixed operating conditions,}$$

where: $G_{max,T}$ is the maximum elemental gain when transmitting, $G_{min,T}$ is the minimum elemental gain when transmitting, $A_T$ is the transmit amplitude adjustment range, $G_{max,R}$ is the maximum elemental gain when receiving, $G_{min,R}$ is the minimum elemental gain when receiving, $A_R$ is the receive amplitude adjustment range.

Distributed parallel transmit RF drive amplifiers 13 are adjusted in amplitude using the present method 30 in the same manner as a single RF drive amplifier 13. Amplitude control devices (amplitude adjustment means 12) in line with each individual RF drive amplifier 13 are adjusted to achieve transmit gain compression in the transmit modules 11 that matches initial calibration measurements of the array antenna 15.

The RF drive level calibration method 30 allows substitution of different RF transmit drive amplifiers 13 into the system 10. Since the relative RF measurement apparatus 19 may be used to determine correctness of RF drive levels based on measurements of the array antenna 15, the proper RF drive level can be determined for any particular amplifier 13. Criticality of the characterization of the RF drive amplifier 13 and absolute power leveling thereof are not issues when using the method 30 as they are with absolute power determination methods.

The method 30 also provides for correction of state command linearization tables for the transmit module 11. The command linearization tables are used to compensate for imperfections in quantizer step sizes. An ideal quantizer typically has equal step sizes over the quantization range. When realized in practical devices, the quantization steps vary from the ideal. Command linearization tables correct for these deviations from ideal. Transmit command state linerization is limited by two primary considerations. These considerations are the deviation of digitally controlled RF attenuator states from their ideal design quantization values and the deviation in linearity of $P_{in}$ versus $P_{out}$ relationship (gain compression) of the transmit module 11.

As radar transmit waveform characteristics (duty factor and pulse repetition frequency) change during operation of the antenna system 10, associated changes occur in the thermal environment of components of the transmit module 11. These thermal changes tend to cause linear gain changes that result in a variation of transmit amplitude adjustment range values. By adjusting RF transmit drive levels to maintain a constant amplitude adjustment range, off-waveform induced phase and amplitude error increases may be largely eliminated. The present invention uses this principle to extend the usable transmit waveform range of command state linearization tables.

Measured data and description experiments were performed on transmit modules 11 to prove the feasibility of the present invention. Two experiments were conducted to show that transmit adjustment range (compression) is controllable, in a deterministic fashion, via transmit RF drive adjustment, and to show that calibrated error performance may be restored via transmit RF drive adjustment.

Figure 2:
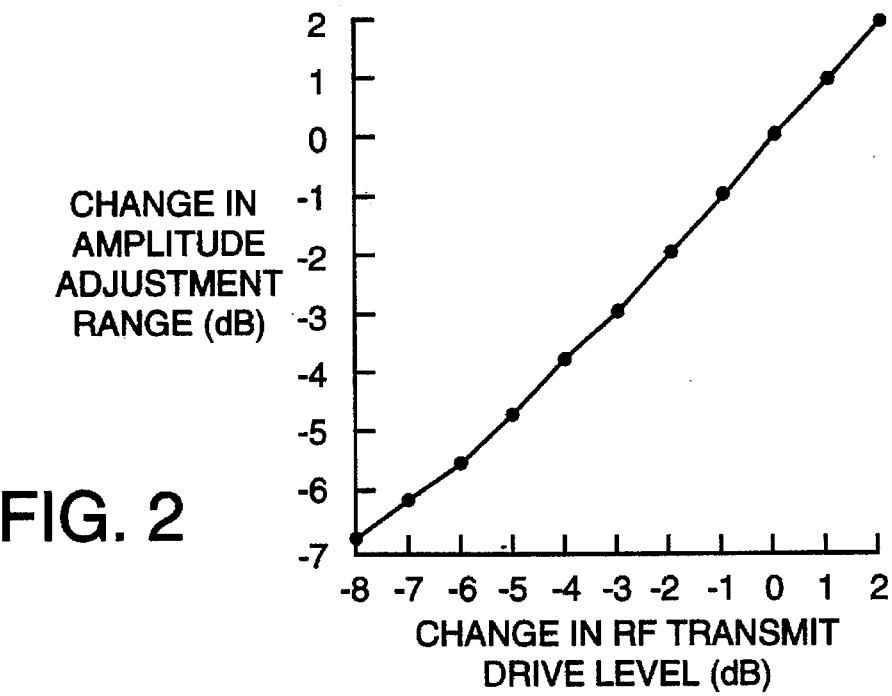
FIG. 2 is a graph showing measured transmit amplitude adjustment range as a function of varying transmit RF drive that is used in the present method.

The first experiment demonstrated the relationship between transmit amplitude adjustment range and transmit RF drive level. A transmit module 11 under test exhibited predictable behavior when driven with varying transmit RF drive signal levels. The output power of the transmit module 11 varied very little due to its saturated operating condition. The difference between minimum and maximum power for the module 11 (module adjustment range) scaled linearly in dB with transmit RF drive level. FIG. 2 is a graph showing dependence of amplitude adjustment range on the transmit RF drive level. This relationship may be used to alter the transmit RF drive level to achieve a desired amplitude adjustment range. The corrections to the RF drive level may thus be determined by a ratio of RF measurements ($P_{out}$ at maximum and minimum commanded attenuation).

The second experiment demonstrated restoration of calibrated error performance via RF transmit drive level adjustment. Data was collected in this experiment to demonstrate that good error performance can be restored when operating conditions are different from those that existed during calibration data collection. Calibration data was collected for a 35% transmit duty waveform at a nominal RF transmit drive level. Calibration state command linearization tables employed in the antenna controller 18 were generated for this data, and RMS error performance for the base set of conditions was calculated. Table 1 shows the calibrated error versus transmit RF drive level. The first line of data in Table 1 shows the amplitude adjustment range along with RMS phase and gain errors for the base set of conditions.

Data for a 15% transmit duty cycle waveform (at nominal transmit drive) was also collected for the transmit module 11. RMS phase and gain errors were calculated for 15% duty cycle operation, while using the command linearization tables determined for the baseline 35% transmit duty cycle conditions. The second row of Table 1 shows that the error for this case rose to 2.06 dB gain and 2.63° phase. Similarly, the amplitude adjustment range decreased by 2.27 dB (23.24–20.97). The lower three rows of Table 1 show that by adjusting the transmit RF drive level down by 2.4 dB, the adjustment range and calibrated error performance are restored to within acceptable measurement repeatability limits.

TABLE 1

| Waveform | Transmit drive (Td) Level | Adjustment Range | Phase Error (Degrees RMS) | Amplitude Error (dB RMS) |
|---|---|---|---|---|
| 35% duty | Nominal Td | 23.24 | 1.97 | 0.36 |
| 15% duty | Nominal Td | 20.97 | 2.63 | 2.06 |
| 15% duty | Td–2.5 dB | 23.33 | 2.17 | 0.41 |
| 15% duty | Td–2.4 dB | 23.14 | 2.16 | 0.39 |
| 15% duty | Td–2 3 dB | 23.01 | 2.16 | 0.43 |

Figure 3:
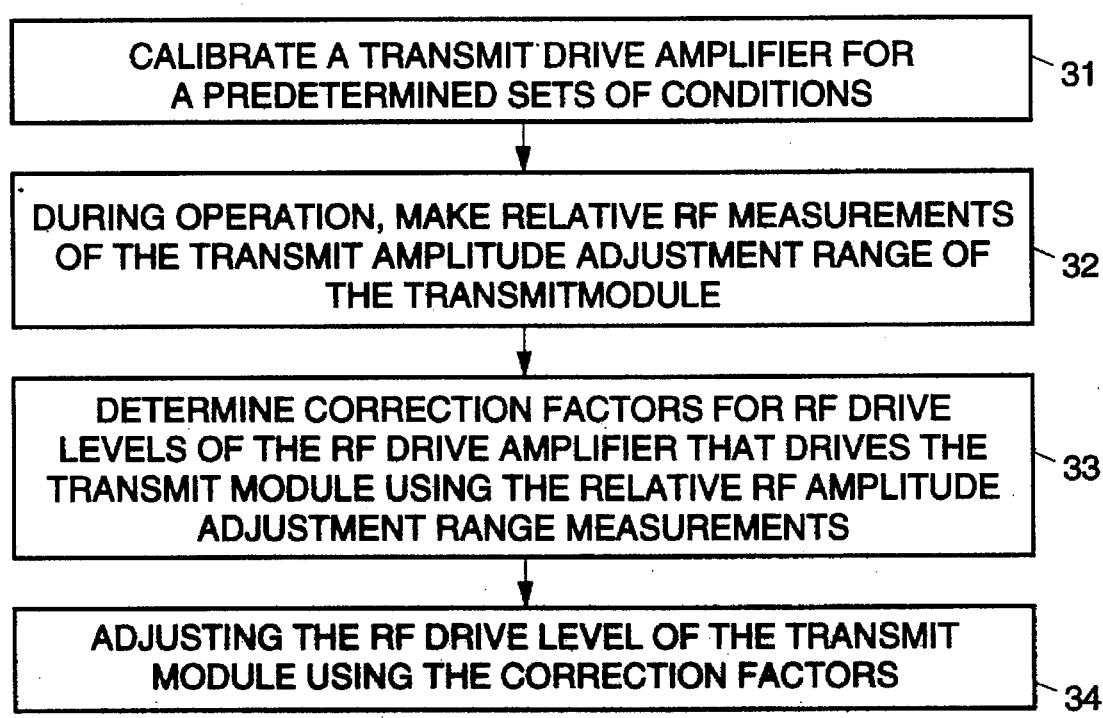
FIG. 3 is a flow chart showing the steps in an RF drive leveling adjustment method in accordance with the present invention.

For the purposes of completeness, FIG. 3 is a flow chart showing the steps in the RF drive leveling adjustment method 30 in accordance with the present invention. The first step comprises calibrating 31 transmit RF drive amplifiers 13 of an active phased array antenna system 10 having a transmit module 11 comprising transmit RF drive amplifiers 13 for a predetermined transmit duty factor and pulse repetition frequency. The second step comprises measuring 32 relative RF measurements of a transmit amplitude adjustment range of the transmit module 11. The third step comprises determining 33 correction factors for RF drive levels of the transmit RF drive amplifiers 13 such that the transmit amplitude adjustment range of the module 11 is constant. The fourth step comprises adjusting 34 the RF drive level of the transmit RF drive amplifiers 13 using the correction factors. As a result of using the correction factors, phase and gain command linearization table performance of the transmit modules 11 is preserved.

Thus, an RF drive leveling adjustment method for use with active phased array antennas that restores phase and gain command linearization tables as well as phase variability associated with drive variation has been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. An RF drive leveling adjustment method of use with an active phased array antenna system having a transmit module comprising a transit RF drive amplifier, said method comprising the steps of:

calibrating the transmit RF drive amplifier for a predetermined transmit duty factor and pulse repetition frequency;

making relative RF measurements of transmit amplitude adjustment range of the transmit module for a number of duty factors and pulse repetition frequencies spanning operating conditions to be encountered by the system;

determining correction factors for RF drive levels of the transmit RF drive amplifier such that a constant amplitude adjustment range of the transmit module is maintained; and adjusting the RF drive level of the transmit RF drive amplifier using the correction factors, wherein the active phased array antenna system comprises transmit/receive modules that share an attenuator for both transmission and reception and wherein the step of determining the correction factors for the transmit/receive modules comprises computing the correction factors using the equation:

$$G_{max,R}/G_{min,R}=A_R, \text{ and } G_{max,T}/G_{min,T}=A_T=A_R/A_{comp}, (G_{max,R}/G_{min,R})/(G_{max,T}/G_{min,T})=A_R/A_{comp}=A_{comp}=\text{transmit gain compression}, A_{comp}=\text{a constant for fixed operating conditions},$$

where: $G_{max,T}$ is the maximum elemental gain when transmitting, $G_{min,T}$ is the minimum elemental gain when transmitting, $A_T$ is the transmit amplitude adjustment range. $G_{max,R}$ is the maximum elemental gain when receiving, $G_{min,R}$ is the minimum elemental gain when receiving, $A_R$ is the receive amplitude adjustment range.

2. The method of claim 1 wherein the step of adjusting the RF drive level of the transmit RF drive amplifier comprises adjusting an amplitude adjustment circuit coupled to the amplifier to adjust the RF drive level of an RF drive signal applied to the RF drive amplifier.

3. The method of claim 1 wherein the step of adjusting the RF drive level of the transmit RF drive amplifier comprises adjusting a digitally controlled attenuator coupled to the amplifier to adjust the RF drive level of an RF drive signal applied to the RF drive amplifier.

4. The method of claim 3 wherein the step of determining the correction factors comprises computing the correction factors using the equation:

$$G_{max,T}/G_{min,T}=A_T=\text{a constant for fixed operating conditions},$$

where: $G_{max,T}$ is the maximum elemental gain when transmitting, $G_{min,T}$ is the minimum elemental gain when transmitting, $A_T$ is the transmit amplitude adjustment range, and the magnitude is related to gain compression.

* * * * *

UNITED STATES PATENT AND TRADEMARK OFFICE
CERTIFICATE OF CORRECTION

PATENT NO : 5,644,316
DATED : July 1, 1997
INVENTOR(S) : Gib F. Lewis and Eric N. Boe It is certified that error appears in the above-identified patent and that said Letters Patent is hereby corrected as shown below:

At column1, line 6, insert the following as the first paragraph after the heading BACKGROUND:

-- This invention was made with Government support under a contract awarded by a Government agency. The Government has certain rights in this invention. --

Signed and Sealed this

Twelfth Day of September, 2000

*Attest:*

Q. TODD DICKINSON

*Attesting Officer*  *Director of Patents and Trademarks*